C. H. PELTON.
SEED DRILL.
APPLICATION FILED JULY 12, 1912.
1,107,344.
Patented Aug. 18, 1914.
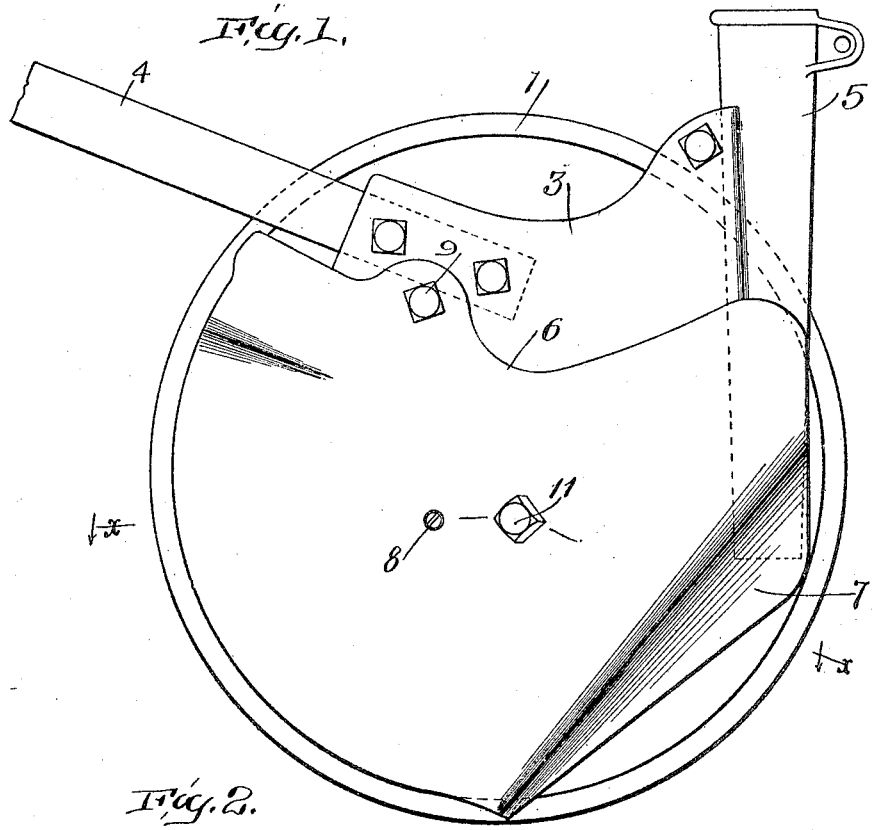
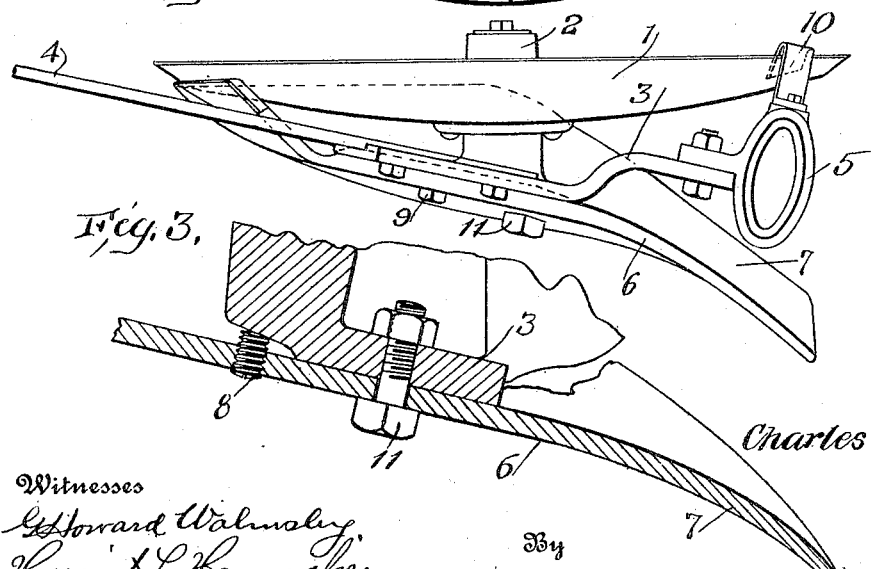
Witnesses
G. Howard Walmsley.
Harriet L. Hammaker.
Inventor
Charles H. Pelton,
By
Toulmin and Reed
Attorneys

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

SEED-DRILL.

1,107,344.      Specification of Letters Patent.      Patented Aug. 18, 1914.

Application filed July 12, 1912. Serial No. 708,938.

*To all whom it may concern:*

Be it known that I, CHARLES H. PELTON, a citizen of the United States, residing at Springfield, in the county of Clark and State of Ohio, have invented certain new and useful Improvements in Seed-Drills, of which the following is a specification, reference being had therein to the accompanying drawing.

This invention relates to seed drills and the object of the invention is to provide in a disk drill means for forming a wide, open furrow in which the seed will remain uncovered until it is covered by the action of the rain and wind.

To this end it is a further object to provide in combination with a revolving disk a share extending from a point near the forward edge of the disk to a point near the boot and having its rear edge flared in such a manner as to throw the soil back away from the furrow.

In the accompanying drawings, Figure 1 is a side elevation of a disk with its supporting devices and the seed boot showing my invention applied thereto; Fig. 2 is a top, plan view of the same; and Fig. 3 is a sectional view taken through the share on the line $x$ $x$ of Fig. 1 and looking in the direction of the arrows, with the forward portion of the share broken away.

In these drawings I have illustrated one embodiment of my invention and have shown the same as combined with the revolving disk of an ordinary seed drill. As here shown the disk 1 is mounted by means of a bearing 2 upon a supporting member or bracket 3 which is secured to a drag bar 4 which, in turn, is connected with the body of the drill, which is not here shown, and serves to hold the bracket 3 and the parts connected therewith normally against movement relatively to the machine as a whole. A seed tube 5 is secured to the rear edge of the bracket and communicates with the hopper of the drill and serves to convey the seed into the furrow opened by the disk and its coöperating devices. The disk, as shown, is the ordinary concavo-convex furrow opening disk but this particular shape is not essential to the operation of the invention. Rigidly mounted on the bracket, preferably by means of a bolt 11, on the convex side of the disk 1 is a share 6 having its forward portion shaped to fit snugly about the adjacent portion of the disk and curved to conform to the arc of a circle described about the axis of the disk on a radius slightly less than the radius of the disk, thus causing the forward edge of the share, which edge is quite thin, to be spaced a short distance away from the forward edge of the disk and to fit snugly against the convex surface of the disk, and causing the disk to form the cutting edge but permitting the share to engage the soil immediately in the rear of this cutting edge. The share extends rearwardly to a point near the lower end of the seed boot 5 and preferably extends slightly beyond that boot. The share diverges from the disk throughout its length, that is, from its curved forward edge which is arranged adjacent to said disk, and has its lower rear portion flared outwardly along a line extending upwardly and rearwardly from the lower portion of the share, as indicated at 7, to throw the dirt away from the furrow and prevent its falling into the same. It will be noted that the rear edges of the disk and share are spaced a considerable distance apart and as both are shaped to throw the soil away from the furrow which has been opened it will be apparent that the two devices coöperate to form a wide, open furrow. This furrow not only remains open but is of such a width and the furrow opening devices are so spaced with relation one to the other that a very wide tube can be utilized or, if desired, two seed tubes can be utilized, thus enabling large quantities of seed or large quantities of fertilizer to be deposited in a furrow. Further, the arrangement of the share with relation to the disk is such that the device not only opens a wide furrow but cuts to the center of the furrow, thus entirely eliminating the ridge or "core" of uncut soil usually found at the center of furrows formed by the furrow-opening devices of the disk cut. This feature is important inasmuch as it enables the seed to be planted at the bottom and in the center of the furrow.

To enable the forward edge of the share to be adjusted relatively to the disk and thus permit it to be used with disks varying in shape I have provided an adjusting device which is here shown as a screw 8 screw-threaded into the share and bearing against a portion of the bracket 3. The upper portion of the share is connected with the bracket 3 by means of a bolt 9, the tightening of which will tend to draw the forward edge of the share toward the disk. This movement is limited by the screw 8 and by adjusting the screw and the bolt the forward edge of the disk can be brought into the proper relation to the disk.

A scraper 10 is secured to one side of the boot and has its lower end arranged adjacent to the edge of the disk on the concave side thereof and serves to remove any soil or other matter which may adhere to the disk.

While I have shown and described one embodiment of my invention it will be understood that this has been chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

1. In a seed drill, the combination, with a supporting member, and concavo-convex disk rotatably mounted on said member, of a share carried by said supporting member on the convex side of said disk, said share extending from a point near the forward edge of said disk to a point near the rear edge thereof and having its forward edge conformed substantially to the shape of the forward edge of said disk, said share diverging from the disk from the front edge of said share to the rear edge thereof to provide a wide space between the rear edge of said share and the disk, a seed tube supported near the rear edge of said disk and extending into said space.

2. In a seed drill, the combination, with a supporting member, and a concavo-convex disk rotatably mounted on said member, of a share carried by said member on the convex side of said disk and having its forward edge conformed substantially to the shape of the forward edge of said disk, said share extending from a point near the forward edge of said disk to a point near the rear edge thereof and diverging rearwardly from the disk, the lower rear portion of said share being flared outwardly along a line extending upwardly and rearwardly.

3. In a seed drill, the combination, with a supporting member, and a disk rotatably mounted on said member, of a share carried by said member and having its forward edge conformed substantially to the shape of the forward edge of said disk, said share diverging from the disk from the front edge of said share to the rear edge thereof and providing a wide space between the rear edge of said disk and said share, a seed tube extending into said space, and means to adjust the forward edge of said share relatively to said disk.

4. In a seed drill, the combination with a supporting member, and a disk rotatably mounted on said member, of a share coöperating with the disk to form a furrow opener, means connecting the share and member, other means connecting the share and member for adjusting the forward edge of the share relative to the forward edge of the disk, and means for limiting the adjustment of said share.

5. In a seed drill, the combination with a supporting member, and a disk rotatably mounted on said member, of a share coöperating with the disk to form a furrow opener, means connecting the share and member, other means connecting the share and member for adjusting the forward edge of the share relative to the forward edge of the disk, and an adjustable stop for limiting the adjustment of said share.

In testimony whereof I affix my signature in presence of two witnesses.

CHARLES H. PELTON.

Witnesses:
ANNETTE A. McHUGH,
CHASE STEWART.